United States Patent
Das et al.

(10) Patent No.: US 11,050,945 B2
(45) Date of Patent: Jun. 29, 2021

(54) METHOD AND APPARATUS FOR CAPTURING DYNAMIC IMAGES

(71) Applicant: Samsung Electronics Co., Ltd., Suwon-si (KR)

(72) Inventors: Saikat Kumar Das, Kolkata (IN); Pradeep Kumar Sindhagatta Krishnappa, Bengaluru (IN); Pranav Prakash Deshpande, Bengaluru (IN); Karthik Srinivasan, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/504,978

(22) Filed: Jul. 8, 2019

(65) Prior Publication Data

US 2020/0014836 A1    Jan. 9, 2020

(30) Foreign Application Priority Data

Jul. 6, 2018   (IN) .............................. 201841025380
Oct. 24, 2018  (IN) .............................. 2018 41025380
Jun. 28, 2019  (KR) ........................ 10-2019-0078342

(51) Int. Cl.
| | |
|---|---|
| H04N 5/235 | (2006.01) |
| H04N 5/14 | (2006.01) |
| H04N 9/31 | (2006.01) |
| H04N 9/04 | (2006.01) |
| G06T 3/40 | (2006.01) |

(52) U.S. Cl.
CPC ........... *H04N 5/2353* (2013.01); *H04N 5/144* (2013.01); *H04N 9/0455* (2018.08); *H04N 9/3111* (2013.01)

(58) Field of Classification Search
None
See application file for complete search history.

(56) References Cited

U.S. PATENT DOCUMENTS

| | | | |
|---|---|---|---|
| 6,943,831 B2 | 9/2005 | Gallagher et al. | |
| 2009/0034867 A1 | 2/2009 | Rempel et al. | |
| 2011/0019040 A1 | 1/2011 | Guidash | |
| 2012/0257789 A1 | 10/2012 | Lee et al. | |
| 2016/0037020 A1* | 2/2016 | Solhusvik | H04N 5/2355 348/231.99 |
| 2016/0239967 A1* | 8/2016 | Chou | G06T 7/11 |

(Continued)

FOREIGN PATENT DOCUMENTS

KR    10-2012-0064401 A    6/2012

OTHER PUBLICATIONS

International Search Report with Written Opinion dated Oct. 16, 2019; International Appln. No. PCT/KR2019/008357.

(Continued)

*Primary Examiner* — Mark T Monk
(74) *Attorney, Agent, or Firm* — Jefferson IP Law, LLP

(57) ABSTRACT

A method and apparatus for capturing images with a high degree of movements in a captured scene are provided. The method includes receiving, by an image sensor, a sequence of images including a plurality of RGB image frames and color event data, generating a plurality of pseudo color filter array (CFA) frames based on the color event data, and generating dynamic images by combining the plurality of RGB image frames and the plurality of pseudo CFA frames.

17 Claims, 7 Drawing Sheets

(56) References Cited

U.S. PATENT DOCUMENTS

2016/0352995 A1 12/2016 Min et al.
2017/0084044 A1* 3/2017 Keh ..................... H04N 13/207

OTHER PUBLICATIONS

Moeys Diederik Paul et al: "Color temporal contrast sensitivity in dynamic vision sensors", XP033156028, May 28, 2017.
Li Chenghan et al: "Design of an RGBW color VGA rolling and global shutter dynamic and active-pixel vision sensor", XP033183266, May 24, 2015.
Extended European Search Report dated May 21, 2019, issued in European Application No. 19830686.2.

* cited by examiner

METHOD AND APPARATUS FOR CAPTURING DYNAMIC IMAGES

CROSS-REFERENCE TO RELATED APPLICATION(S)

This application is based on and claims priority under 35 U.S.C. § 119(a) of an Indian patent application number 201841025380, filed on Jul. 6, 2018, in the Indian Patent Office, of an Indian patent application number 201841025380, filed on Oct. 24, 2018, in the Indian Patent Office, and of a Korean patent application number 10-2019-0078342, filed on Jun. 28, 2019, in the Korean Intellectual Property Office, the disclosure of each of which is incorporated by reference herein in its entirety.

BACKGROUND

1. Field

The disclosure relates to a method and apparatus for processing high dynamic images to appropriately reflect a high degree of movements in images of a scene.

2. Description of Related Art

Recently, an apparatus such as a smart phone as well as a camera apparatus has a high performance camera to capture high definition images. However, when an object in images of a scene moves very fast, even the high performance camera has difficulties in properly capturing the object through a camera sensor and displaying the object on an apparatus.

For example, when a user tries to capture an outside scene through a window in a room where he/she is located, the brightness of an image corresponding to the room will be significantly lower than that of an image corresponding to the window. In this case, excessive exposure occurs in the image corresponding to the window due to different brightness of the images, and accordingly, it is not easy to capture movements in the image corresponding to the window.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for processing high dynamic images to properly reflect a high degree of movements of an object in a scene to be captured through an apparatus including an image sensor to images.

Additional aspects will be set forth in part in the description which follows and, in part, will be apparent from the description, or may be learned by practice of the presented embodiments.

In accordance with an aspect of the disclosure, an image capturing method is provided. The image capturing method includes receiving, by an image sensor, a sequence of images including a plurality of red, green, and blue (RGB) image frames and color event data, generating a plurality of pseudo color filter array (CFA) frames based on the color event data, and generating dynamic images by combining the plurality of RGB image frames and the plurality of pseudo CFA frames.

In accordance with another aspect of the disclosure, an image capturing apparatus is provided. The image capturing apparatus includes an image sensor configured to receive a sequence of images including a plurality of RGB image frames and color event data, a processor configured to generate a plurality of pseudo CFA frames based on the color event data, and generate dynamic images by combining the plurality of RGB image frames and the plurality of pseudo CFA frames, and a display configured to display the generated dynamic images.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
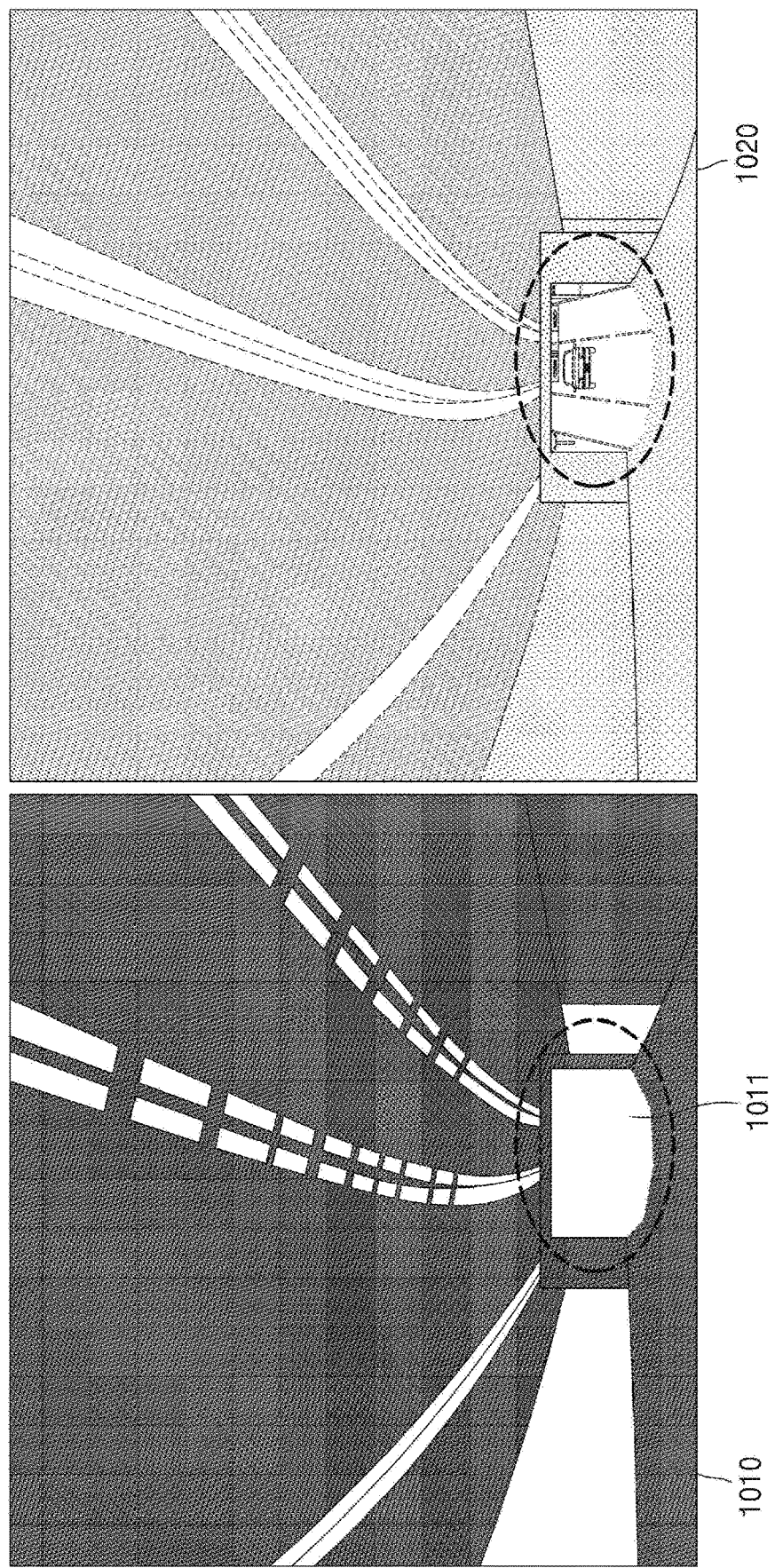
FIG. 1 is a view comparing images that are captured by an image sensor, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in this specification will be briefly described, and the disclosure will be described in detail.

Although general terms being widely used at the disclosure were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be given in the detailed description of the disclosure. Hence, the terms must be defined based on the meanings of the terms and the contents of the entire specification, not by simply stating the terms themselves.

It will be understood that when the terms "includes," "comprises," "including," and/or "comprising," when used in this specification, specify the presence of stated elements and/or components, but do not preclude the presence or addition of one or more elements and/or components thereof. As used herein, the terms "portion", "module", or "unit" refers to a unit that can perform at least one function or operation, and may be implemented as a software or hardware component or as a combination of software and hardware.

Hereinafter, various embodiments of the disclosure will be described in detail with reference to the accompanying drawings so that the disclosure may be readily implemented by those skilled in the art. However, the disclosure is not limited to these embodiments of the disclosure, and may be embodied in various other forms. In the drawings, parts irrelevant to the description are omitted for the simplicity of explanation, and like reference numerals refer to like elements throughout the specification.

Throughout the disclosure, the expression "at least one of a, b or c" indicates only a, only b, only c, both a and b, both a and c, both b and c, all of a, b, and c, or variations thereof.

High dynamic range (HDR) technology is used in a camera for capturing images by applying different intensities of illumination (brightness or exposure) to different regions of a scene.

Generally, a camera capturing high dynamic images has difficulties due to problems as follows. First, the camera capturing high dynamic images has a problem due to low sensitivity. That is, because the camera capturing high dynamic images needs to have a high frame rate, a light exposure time is shortened, and accordingly, the camera has low picture quality. Also, the camera capturing high dynamic images has low resolution. That is, because the camera capturing high dynamic images needs to capture images at a high frame rate, captured images have low resolution and have limitation in field of view (FOV). Also, the camera capturing high dynamic images requires a high bandwidth. However, an image sensor of the camera capturing high dynamic images limits the frame rate to 960 fps to 80 fps due to its limited memory.

Also, the camera capturing high dynamic images requires high ISO settings. Increasing the ISO of a camera results in an increase of light sensitivity, and decreasing the ISO of a camera results in a decrease of light sensitivity. Accordingly, as the ISO of the camera increases, images may become brighter. However, higher ISO may result in more noise in captured images.

The disclosure relates to a method of generating high dynamic images of a scene. For example, the method may generate high dynamic images by capturing images of a scene through two kinds of sensors having a short exposure time and a long exposure time and then combining the images. However, two images having a short exposure time and a long exposure time are most difficult to be combined when different movements occur in the two images. That is, when movements between two images having a short exposure time and a long exposure time are not properly aligned with respect to each other, an image combination process may fail.

FIG. 1 is a view comparing images that are captured by an image sensor, according to an embodiment of the disclosure.

Referring to FIG. 1, 1010 represents an example of an image that is captured by a complementary metal-oxide-semiconductor (CMOS) sensor, and 1020 represents an example of an image that is captured by an image sensor, specifically, an event-based sensor including a dynamic vision sensor.

As shown in 1010, pixels in a region captured by the CMOS sensor have the same exposure time. In this case, 1011 representing an oversaturated region in which light is over-exposed may have difficulties in identifying objects in the scene due to the over-exposure of light. That is, due to excessively bright light, actual movements may not be properly captured on an image.

Due to the aforementioned reason, depth estimation of the oversaturated region 1011 in the image that is captured by the CMOS sensor may be not properly performed. A camera apparatus adapting a CMOS sensor may have difficulties in capturing images of a scene at a high frame rate and with low power and also may be unsuitable to provide fast visual feedbacks.

In contrast, 1020 is an image that senses only movements by changing a degree of exposure of a region which may become an oversaturated region. It is seen from 1020 that the camera apparatus may generate an image with accurate movement information in spite of lack of color information, and may capture movements of an object in a scene at a high frame rate and with low power.

Figure 2:
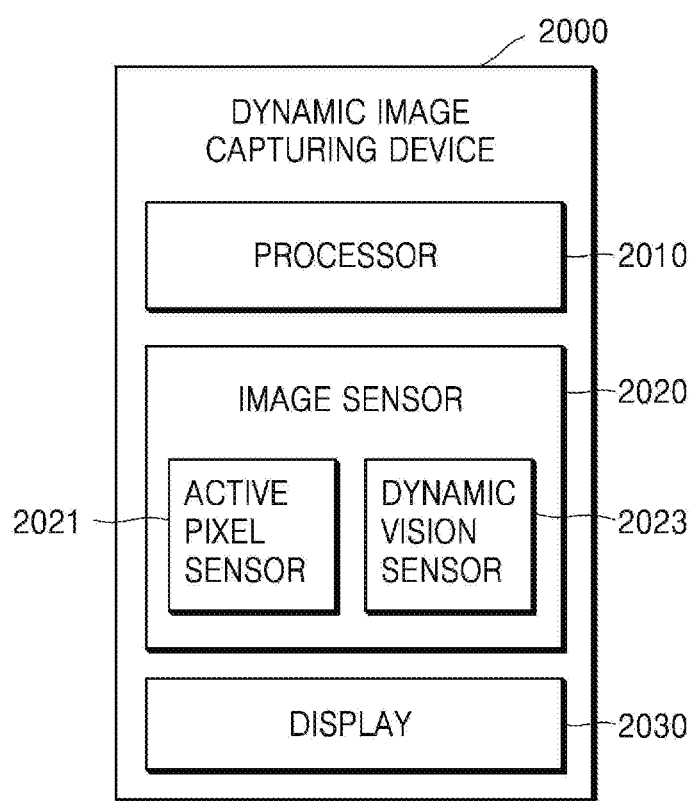
FIG. 2 is a block diagram of a dynamic image capturing apparatus according to an embodiment of the disclosure.

FIG. 2 is a block diagram of a dynamic image capturing apparatus according to an embodiment of the disclosure.

Referring to FIG. 2, a dynamic image capturing apparatus 2000 may include a processor 2010, an image sensor 2020, and a display 2030. The image sensor 2020 may include an active pixel sensor (APS) 2021 and a dynamic vision sensor (DVS) 2023.

When the image sensor 2020 captures a scene to receive a sequence of image data, the APS 2021 may acquire a plurality of RGB image frames, and the DVS 2023 may acquire color event data. In this specification, RGB frame data, RGB image frame data or RGB image frames will be used as the same meaning. Also, color event data and event data will be used as the same meaning. In addition, the scene may be used interchangeable with the scene image(s).

The RGB image frames may mainly include color information and texture information of images, and the color event data may mainly include movement (motion) information of the images.

The dynamic image capturing apparatus 2000 may be one of various electronic devices capable of capturing scenes and generating images. For example, the dynamic image capturing apparatus 2000 may be a smart phone, a drone, a mobile robot, an autonomous driving vehicle, a smart watch, a computing device, a headset mounted display, personal digital assistants (PDA), a tablet, a phablet, or a camera.

According to an embodiment of the disclosure, the dynamic image capturing apparatus 2000 may capture an image of a scene through the image sensor 2020 to receive a sequence of image data. The scene may be a 2Dimensional (2D) scene, a 3Dimensional (3D) scene or a video with a large amount of movements. The image sensor 2020 may be a kind of color event based sensor. The image sensor 2020 may be a sensor, such as a RGB camera, a charge coupled device (CCD) sensor, or a complementary metal-oxide-semiconductor (CMOS) sensor, although not limited thereto.

The APS 2021 may be a sensor for acquiring RGB image frames of a scene to be captured. That is, RGB image frame data may be acquired through the APS 2021. The RGB image frames may be frames including color information of the scene.

The dynamic vision sensor 2023 may acquire color event data of the sequence of images that are captured. The color event data may be data obtained by detecting and sensing a change in movements or a degree of movements of an object in the sequence of images. The object may be a subject that makes movements in the sequence of images, and may be anything making movements, such as a human, an animal, or a moving thing Generally, a change in movements of the object may occur at edges surrounding the object in the sequence of images. That is, when the object is a human, a greater change in movements may occur at the human's edges than at the human's trunk. According to an embodiment of the disclosure, the color event data may be acquired by sensing a change in pixel intensity of the sequence of images in a part with a lot of movements. That is, color data of a pixel at the same location in the sequence of images may be fixed to one value (one color value), and intensity of the pixel may be measured. When a change in intensity of the pixel is significant, the location may be recognized as a location at which a lot of movements occur.

The dynamic image capturing apparatus 2000 may acquire the sequence of image data through the image sensor 2020. The sequence of image data may include a plurality of RGB image frames corresponding to the scene to be captured and color event data of the scene.

The processor 2010 may generate a plurality of pseudo color filter array (CFA) frames between neighboring RGB image frames of the RGB image frames, based on the color event data of the sequence of image data. The processor 2010 may determine a feature correlation which is a degree of movement changes of an object between the neighboring RGB image frames of the RGB image frames and the plurality of pseudo CFA frames.

According to an embodiment of the disclosure, a first RGB image frame may be acquired at t=0 ms, and at t=10 ms, a second RGB image frame as a neighboring RGB image frame of the first RGB image frame may be acquired. At this time, 6 pseudo CFA frames may be acquired at intervals of 2 ms between t=0 ms and t=10 ms. At this time, the processor 2010 may determine a feature correlation between frames in consideration of movement changes when each of the 6 pseudo CFA frames is combined with the first and second RGB image frames. The processor 2010 may combine the RGB image frames with the pseudo CFA frames based on the determined feature correlation to generate dynamic images. The dynamic images may be generated by adjusting colors to the pseudo CFA frames and then de-mosaicking the color-adjusted pseudo CFA frames. To adjust the colors of the pseudo CFA frames for generating the dynamic images, color information may be needed. The color information may be obtained from the RGB image frames. That is, the processor 2010 may compare the RGB image frames with the plurality of pseudo CFA frames of a relatively high frame rate to identify missing information missed in the plurality of pseudo CFA frames with reference to the RGB image frames. As a result, the processor 2010 may add the identified missing information to the plurality of pseudo CFA frames to generate the dynamic images. According to an embodiment of the disclosure, the missing information may be color information.

The processor 2010 may appropriately control a frame rate at which the color event data is captured. The color event data may be information including information about movements in the captured scene, as described above. When it is determined that a lot of movements exist in the sequence of images, the processor 2010 may increase a frame rate at which the color event data is captured. According to an embodiment of the disclosure, a degree of movements of the object in the sequence of images may be determined as follows. When the processor 2010 determines that changes of pixel intensity are great in a region in which movements occur in the sequence of images, the processor 2010 may determine that a degree of movements of the object in the sequence of images is high.

Also, according to an embodiment of the disclosure, the processor 2010 may control a degree of exposure when color event data is captured, based on the determination on the degree of movements. For example, when the processor 2010 determines that a frame rate for capturing needs to increase based on the determination on the degree of movements, the processor 2010 may relatively further lower a degree of exposure.

According to an embodiment of the disclosure, when acquiring the color event data through the image sensor 2020, the dynamic image capturing apparatus 2000 may acquire the color event data through a color filter including at least one RGB filter installed at an upper end of the image sensor 2020. A plurality of movement event data may be generated from the color event data acquired by the method.

When a CFA covers a surface of the image sensor 2020, each sensor pixel may sample only one of three main color values R, G, and B. At this time, to generate a full color image, an interpolation process called CFA de-mosaicking may be performed. The other two main color values may be estimated in addition to the color value sampled through the interpolation process. Measuring the two main color values may be to adjust color missing information.

The display 2030 may be used to display the dynamic images. The display 1030 may be a touch screen display, an augmented reality (AR) display, a virtual reality (VR) display, etc.

Although not shown, the dynamic image capturing apparatus 2000 may include a memory. The memory may be used to store captured images. The memory may be a non-volatile memory. The non-volatile memory may be, for example, a magnetic hard disk, an optical disk, a floppy disk, a flash memory, an erasable programmable read only memory (EPROM), or electronically erasable read only memory (EEPROM).

The dynamic image capturing apparatus 2000 shown in FIG. 2 may include various hardware components. However, according to various embodiments of the disclosure, some of the components may be omitted or other components may be added. Also, the names of the components are illustratively given, without being used to limit the scope of the disclosure. For example, the processor 2010 is also called a controller as a component for performing the similar functions. Also, one or more components may be combined to perform the same or substantially similar function to capture and store a high degree of movements of a scene.

Figure 3:
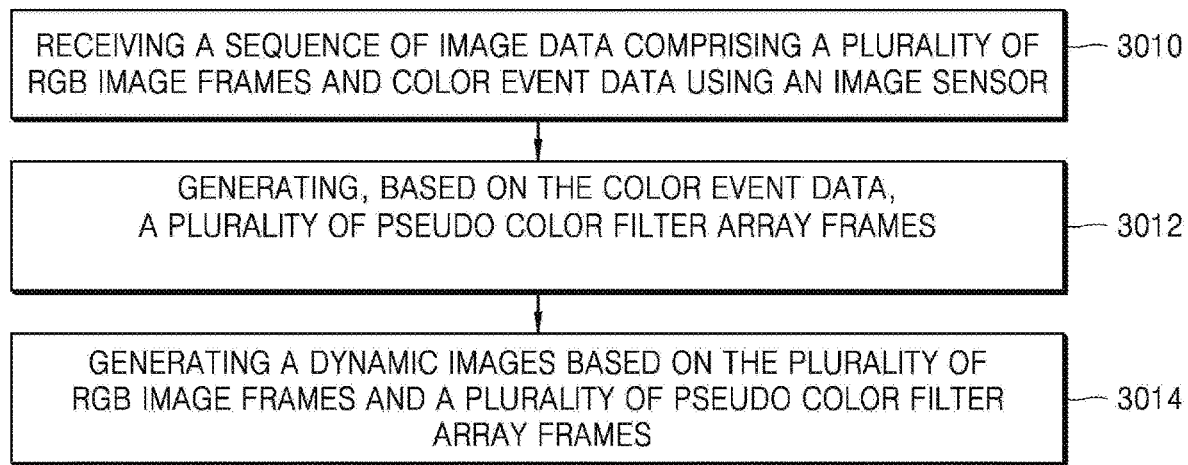
FIG. 3 is a flowchart illustrating a method of capturing dynamic images, according to an embodiment of the disclosure.

FIG. 3 is a flowchart illustrating a method of capturing dynamic images, according to an embodiment of the disclosure.

Referring to FIG. 3, in operation 3010, the dynamic image capturing apparatus 2000 may receive a sequence of image data through a capturing apparatus such as a camera or the image sensor 2020. A sequence of images that are captured may have a scene with a high degree of movements of an object in the images. The sequence of image data may include a plurality of RGB image frames and color event data.

The dynamic image capturing apparatus 2000 may receive a sequence of image data including a plurality of RGB image frames and color event data corresponding to the captured sequence of images. The dynamic image capturing apparatus 2000 may include the image sensor 2020, and the image sensor 2020 may include two sensors having different functions, wherein one of the sensors may be configured to separately sense and process a region of dynamic movements. The other sensor may be used to capture and acquire RGB image frames. When the dynamic image capturing apparatus 2000 acquires the RGB image frames, the dynamic image capturing apparatus 2000 may acquire the RGB image frames based on a pixel intensity data stream of the captured sequence of images.

In operation 3012, the dynamic image capturing apparatus 2000 may generate a plurality of pseudo CFA frames based on the color event data.

According to an embodiment of the disclosure, when generating the plurality of pseudo CFA frames, the dynamic image capturing apparatus 2000 may first generate a gray colored 2D event map using the color event data. The 2D event map may reflect, as understood from the name, only a gray color by simplifying color information so as to accurately reflect movement (event) information. The plurality of pseudo CFA frames may be generated by detecting movements and the gray-colored 2D event map. Because the movements will mainly occur at edges of the object in the sequence of images, the gray-colored 2D event map may be an event map resulting from reflecting changes in edges of the object. According to an embodiment of the disclosure, the movements of the object in the sequence of images may be detected through level/intensity changes of pixels of the images.

The color event data may be captured with a relatively lower intensity of illumination and at a relatively higher frame rate than the RGB image frames. Because color event data is data related to movements in a scene, the color event data may need to be captured at a high frame rate and with a low intensity of illumination.

The plurality of pseudo CFA frames may be generated by using at least one RGB image frame selected from among the plurality of RGB image frames and another RGB image frame neighboring the at least one RGB image frame. That is, the plurality of pseudo CFA frames may be image frames that are generated during a time period between a RGB image frame at a predetermined time t and a RGB image frame at t+1.

The dynamic image capturing apparatus 2000 may determine a low exposure region and a high exposure region based on a degree of movements of the object in the sequence of images for each of the plurality of pseudo CFA frames. According to an embodiment of the disclosure, the dynamic image capturing apparatus 2000 may determine a low exposure region and a high exposure region in each RGB image frame.

According to an embodiment of the disclosure, the dynamic image capturing apparatus 2000 may adjust colors of low exposure regions in the plurality of pseudo CFA frames to generate a plurality of color-adjusted pseudo CFA frames. Then, the dynamic image capturing apparatus 2000 may de-mosaick the plurality of color-adjusted pseudo CFA frames to generate dynamic images.

The low exposure region may be a region where a lot of movements occur. The dynamic image capturing apparatus 2000 may capture images at a high frame rate in other regions except for the low exposure regions.

In operation 3014, the dynamic image capturing apparatus 2000 may combine the plurality of RGB image frames with the plurality of pseudo CFA frames to generate dynamic images. The dynamic images may be images to which dynamic movements of the object in the sequence of images are appropriately reflected.

Figure 4:
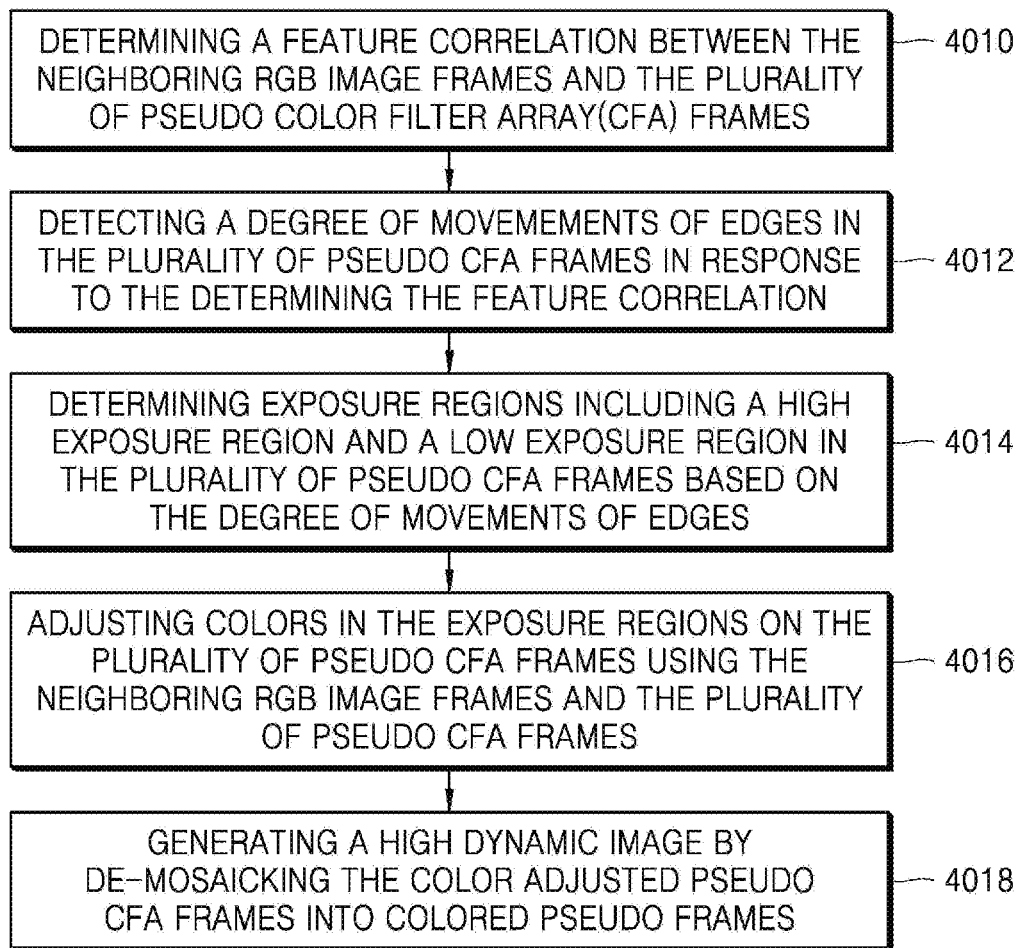
FIG. 4 is a flowchart illustrating a method of capturing dynamic images, according to an embodiment of the disclosure.

FIG. 4 is a flowchart illustrating a method of capturing dynamic images, according to an embodiment of the disclosure.

Referring to FIG. 4, in operation 4010, the dynamic image capturing apparatus 2000 may determine a feature correlation between a RGB image frame, a neighboring RGB image frame, and a plurality of pseudo CFA frames.

According to an embodiment of the disclosure, the feature correlation may be differences in movements between the RGB image frames and the pseudo CFA frames at edge regions in which movements of an object in a scene are most active.

In operation 4012, the dynamic image capturing apparatus 2000 may detect a degree of movements at the edges of the object in the pseudo CFA frame, as a response to the determination of the feature correlation. In operation 4014, the dynamic image capturing apparatus 2000 may determine a high exposure region and a relatively low exposure region in the pseudo CFA frame based on the detected degree of movements at the edges of the object. The low exposure region may be a region where a degree of movements is high, that is, a region where a lot of movements occur. According to some embodiments of the disclosure, the dynamic image capturing apparatus 2000 may detect a degree of movements and then determine a feature correlation based on the detected result.

In operation 4016, the dynamic image capturing apparatus 2000 may adjust colors of the exposure regions on the pseudo CFA frame by using the pseudo CFA frame and the neighboring RGB image frames. Because the pseudo CFA frame is a frame to which a movement change is reflected without a great change in color, the color of the pseudo CFA frame may be adjusted by referring to the RGB image frames according to a change of the edges in which a movement occurs. For example, when an object in an image is a face with black hair and the face moves in a white background, an inside of the edge of the head may be adjusted to a black color and an outside of the edge of the head may be adjusted to a white color according to a movement of the edge of the head.

In operation 4018, the dynamic image capturing apparatus 2000 may de-mosaick the pseudo CFA frames whose colors have been adjusted in operation 4016 to color pseudo frames to generate dynamic images. The above-described operations of capturing images may be performed mainly by the image sensor 2020, but the other operations may be performed by the processor 2010 of the dynamic image capturing apparatus 2000.

Figure 5:
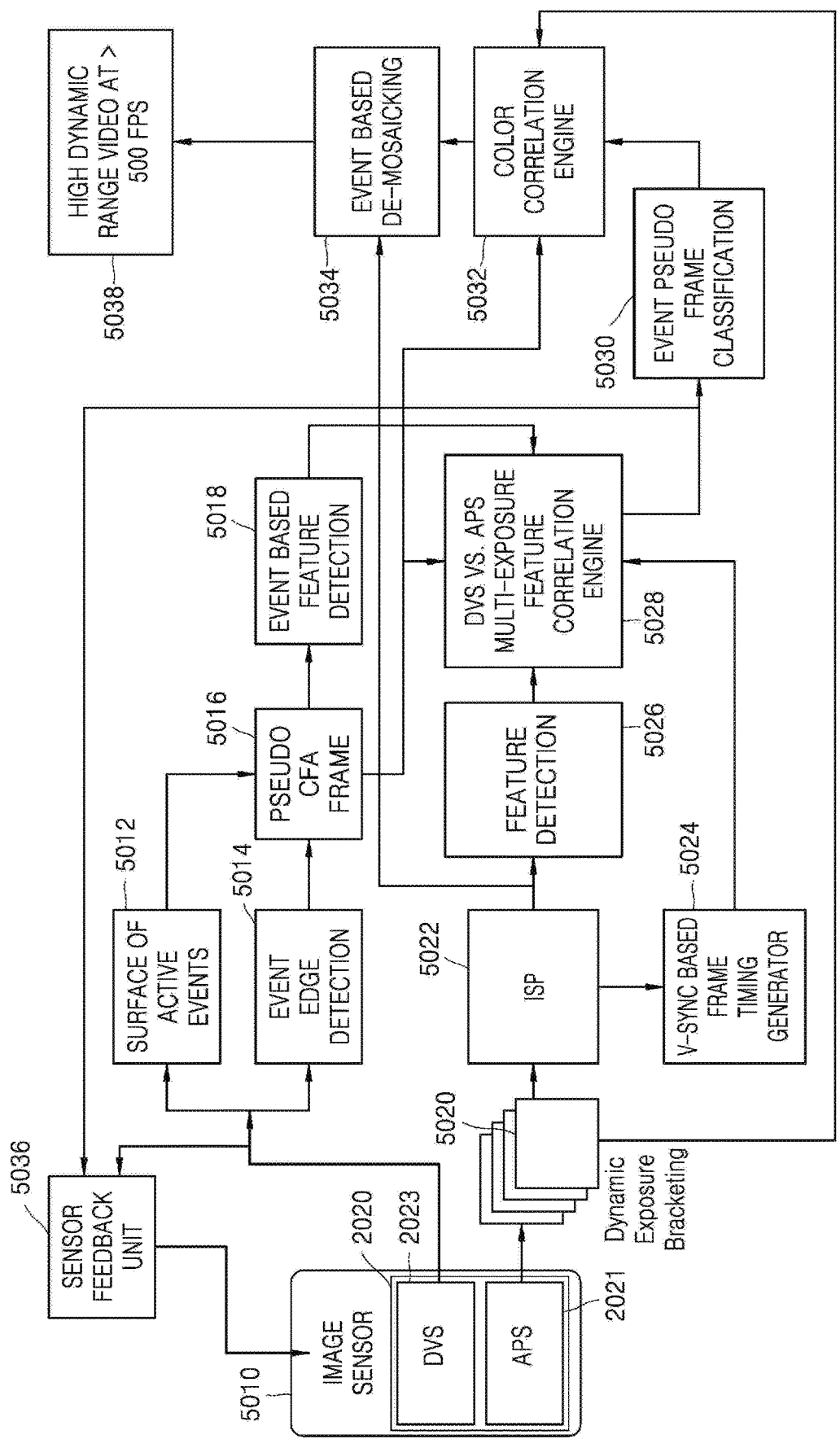
FIG. 5 shows a process of capturing dynamic images, according to an embodiment of the disclosure.

FIG. 5 shows a process of capturing dynamic images, according to an embodiment of the disclosure.

A scene, that is, a sequence of images may be captured by the image sensor 2020. At this time, the DVS 2023 may capture movements of an object in the sequence of images, and the APS 2021 may capture image data including color and texture information of the sequence of images.

The movements of the object may be detected by event edge detection 5014, and a surface of active events (SAE) 5012 may output a sparse output or a gray-colored 2D event map through corner detection. By the two outputs, a pseudo CFA frame 5016 may be generated. For example, when a user accumulates event data of about 1 ms or 2 ms in the image sensor 2020, 500 pseudo CFA frames per second may be generated. However, this is an example, and the dynamic image capturing apparatus 2000 may selectively generate a larger or smaller number of CFA frames.

Because the DVS 2023 is used to detect movements of an object in a scene, the DVS 2023 may not need to operate in other image regions in which no movement occurs. Also, because no color information is required, the dynamic image capturing apparatus 2000 may select an image region where a lot of movements of an object occur with a low bandwidth and low power and record the image region at high speed.

Event based feature detection 5018 may be performed from the pseudo CFA frames. The event may be a movement of an object.

An image captured by the APS 2021 may be an image frame based on color and texture, and a RGB image frame may be an output of the APS 2021.

The dynamic image capturing apparatus 2000 may acquire one or more RGB image frames through dynamic exposure bracketing 5020. The dynamic exposure bracketing 5020 is a technique of obtaining image data in different exposure conditions when acquiring different regions of a sequence of images. For example, a bright region in an image may be captured in a short exposure time, and a dark region in the image may be captured in a long exposure time.

An output of the dynamic exposure bracketing 5020 may be input to an image signal processor (ISP) 5022, and feature detection 5026 may be performed on an image frame processed by the ISP 5022. The feature detection 5026 may be performed using a binary feature detection technique such as an oriented brief (ORB) feature detector.

An output of the feature detection 5026 may be provided to a DVS vs APS multi exposure feature correlation engine 5028. The DVS vs APS multi exposure feature correlation engine 5028 may receive the pseudo CFA frame 5016 and an output of the event based feature detection 5018, and receive an output of a V-sync based frame timing generator 5024. The V-sync based frame timing generator 5024 may perform timing synchronization on the image frame processed by the ISP 5022. In computer vision and image processing, a feature is a part of related information for a computing task related to a certain application. Feature detection may include a method for determining whether a given image type exists at a specific point for all image points and calculating abstraction of image information. The resultant feature may become a subset (generally, a separate point, a continuous curve, or connected regions) of an image domain. The event based feature detection 5018 may be a process for sensing a feature point using event data of the DVS 2023.

An output of the DVS vs APS multi exposure feature correlation engine 5028 may be supplied as an input to event pseudo frame classification 5030. The event pseudo frame classification 5030 may perform appropriate classification for each part of a scene. The event pseudo frame classification 5030 may be a process of determining a part of an image to which a feature of a pseudo CFA frame belongs in a RGB image frame.

An output of the event pseudo frame classification 5030 may be input to a color correlation engine 5032. The color correlation engine 5032 may also receive the pseudo CFA frame 5016 and the dynamic exposure bracketing 5020 as inputs. Through the dynamic exposure bracketing 5020, the RGB image frame may be received, the RGB image frame may include color and texture information, and the pseudo CFA frame 5016 may include movement information. The color correlation engine 5032 may apply a feature correlation between the RGB image frame and the pseudo CFA frame 5016 to convert the pseudo CFA frame 5016 into a high-speed RGB image frame.

The high-speed RGB image frame as an output of the color correlation engine 5032 may be de-mosaicked (5034) together with the output of the ISP 5022. The de-mosaicking 5034 may be a digital imaging technique that is used to reconstruct a full color image in an insufficient color sample output of the image sensor 2020. The de-mosaicking technique is known as CFA interpolation or color reconstruction. Through the de-mosaicking 5034, for example, dynamic images (or dynamic video) of about 500 fps 5038 may be generated.

The sensor feedback unit 5036 may provide feedback information with which a processor may control a frame rate at which the color event data is captured. The feedback information may also include information regarding a degree of exposure for the regions in the image of the scene with which the processor may determine a low exposure region and a high exposure region in each RGB image frame.

It is assumed that a camera captures sequential scenes in which a balloon bursts. A typical camera system captures a balloon that has not yet burst in a first frame, and in the following frame, a burst balloon shape appears. That is, the typical camera system may not capture a scene in which the balloon is bursting, in a middle stage. However, according to the capturing method and apparatus of the disclosure, a series of images in which a moment at which a balloon is bursting is accurately captured may be generated.

Figure 6:
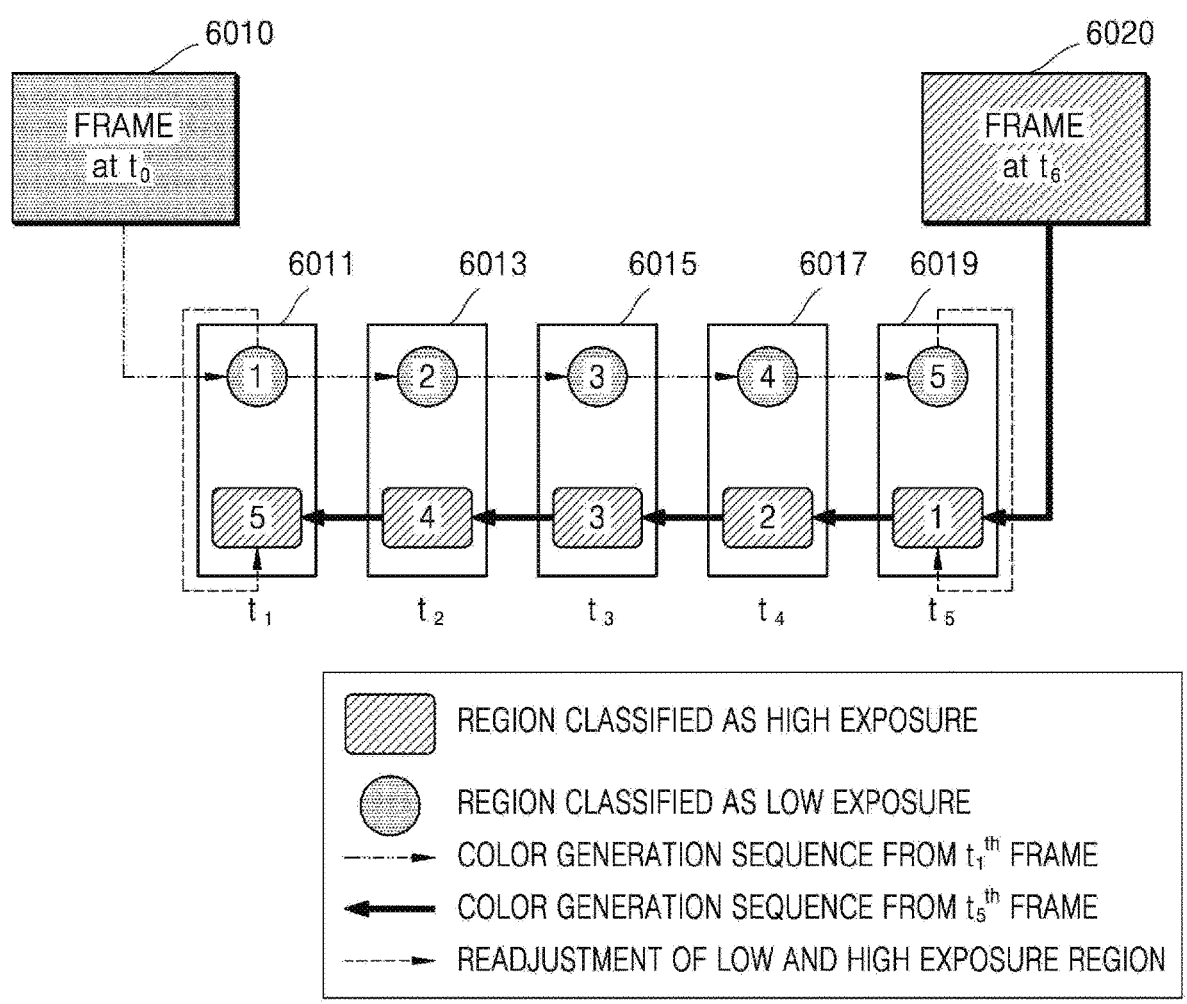
FIG. 6 shows exposure bracketing frames according to an embodiment of the disclosure.

FIG. 6 shows exposure bracketing frames according to an embodiment of the disclosure.

Referring to FIG. 6, the dynamic image capturing apparatus 2000 may perform color adjusting of a scene by using an exposure bracketing technique.

Exposure bracketing frames 6010 and 6020 may be RGB image frames captured by the APS 2021. The exposure bracketing frame 6010 may capture an image at t=t0 (for example, 0 ms), and the exposure bracketing frame 6020 may capture an image at t=t6 (30 ms). In FIG. 6, rectangles 6011, 6013, 6015, 6017, 6017, and 6019 represent pseudo CFA frames, which are generated by using color event data. It is seen that a plurality of pseudo CFA frames exist between t0 and t6. In this case, numbers of the pseudo CFA frames may depend on conditions, and in the embodiment of the disclosure of FIG. 6, it is shown that 5 pseudo CFA frames exist. That is, a pseudo CFA frame may be generated per 6 ms. However, when movements are significant, the processor 2010 may generate pseudo CFA frames at a higher frame rate.

The exposure bracketing frames 6010 and 6020 may have color and texture information, whereas the pseudo CFA frames may have movement information and edge information of an object in the scene.

Between neighboring RGB image frames such as the exposure bracketing frames 6010 and 6020 and the pseudo CFA frames, a significantly higher feature correlation will be found than at other times. Due to the movements of the object in the scene, a part of the scene may make a difference between the pseudo CFA frames and the neighboring RGB image frames. In FIG. 5, the color correlation engine 5032 may correlate the movements with color and texture information. To generate dynamic images, a part of the pseudo CFA frames representing a change in movements may need to be correlated to the RGB image frames.

A correlation method will be described in detail, below.

In the pseudo CFA frames 6011 to 6019, circular frames may be frames having relatively low exposure regions. In contrast, rectangular frames may be frames having relatively high exposure regions. Colors of the low exposure regions may be generated in a direction of t1→t5 by using a trailing edge color among edge frame sequences as a color of leading edges. In contrast, colors of the high exposure regions may be generated in a direction of t5→t1 by using a leading edge color as a color of trailing edges. Through the color generation, color correction may be performed.

Figure 7:
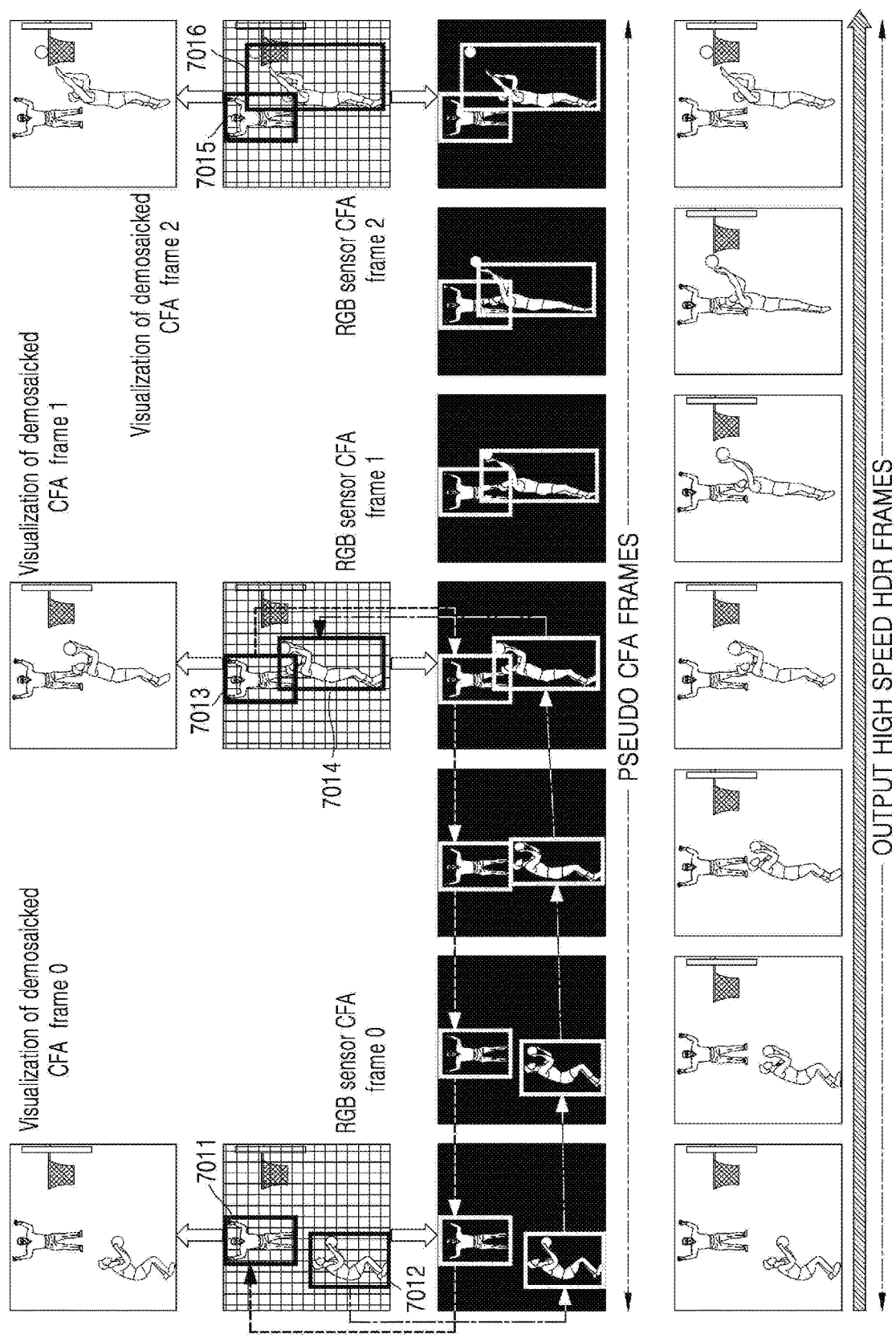
FIG. 7 is a view for describing a method of generating dynamic images, according to an embodiment of the disclosure.

FIG. 7 is a view for describing a method of generating dynamic images, according to an embodiment of the disclosure.

Referring to FIG. 7, an image frame is shown in which a movement occurs from left to right. Pseudo CFA frames may capture images of regions with movements with a gray color at low exposure (intensity of illumination) and a high frame rate, without any color information. For example, regions 7012, 7014, and 7016 may be regions with a lot of movements. The regions may be captured at low exposure and a high frame rate. In contrast, although regions 7011, 7013, and 7015 including a human as an object are regions in which a lot of movements may occur, the regions 7011, 7013, and 7015 actually have little movement. Therefore, the regions 7011, 7013, and 7015 may become regions with relatively higher exposure (high intensity of illumination) than the regions 7012, 7014, and 7016. Accordingly, the regions 7011, 7013, and 7015 may be captured at a low frame rate. Colors of the regions 7011, 7013, and 7015 may be generated in a backward direction by using a leading edge color as a color of trailing edges, according to the embodiment of the disclosure of FIG. 6. In contrast, colors of low exposure regions such as the regions 7012, 7014, and 7016 may be generated in a forward direction indicated by arrows by using a trailing edge color among edge frame sequences as a color of leading edges.

Also, the pseudo CFA frames may be combined with RGB image frames based on a feature correlation to the RGB image frames to obtain high-speed high dynamic region (HDR) frames.

The dynamic image capturing method according to the various embodiments of the disclosure may be implemented in a program command form that can be executed by various computer means, and may be recorded on computer-readable media. The computer-readable media may also include, alone or in combination with program commands, data files, data structures, and the like. Program commands recorded in the media may be the kind specifically designed and constructed for the purposes of the disclosure or well-known and available to those of ordinary skill in the computer software field. Examples of the computer-readable media include magnetic media, such as hard disks, floppy disks, and magnetic tapes, optical media, such as compact disc (CD)-ROM and digital versatile disc (DVD), magneto-optical media such as floptical disks, and hardware devices, such as ROM, random access memory (RAM), flash memory, and the like, specifically configured to store and execute program commands. Examples of the program commands include high-level language codes that can be executed on a computer through an interpreter or the like, as well as machine language codes produced by a compiler.

According to the various embodiments of the disclosure, there are provided a method and apparatus for capturing an image to which an object with fast movements is accurately reflected.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An image capturing method, the method comprising:
    obtaining, by an image sensor, a sequence of images comprising a plurality of red, green, and blue (RGB) image frames and color event data;
    generating a plurality of pseudo color filter array (CFA) frames based on the color event data;
    determining, based on a degree of movements of an object included in the sequence of images, a first exposure region and a second exposure region in each of the plurality of pseudo CFA frames;
    generating, with the plurality of pseudo CFA frames, a plurality of color adjusted pseudo CFA frames by adjusting colors in the first exposure region;
    and generating dynamic images by de-mosaicking the plurality of color adjusted pseudo CFA frames.

2. The method of claim 1, wherein the color event data is captured with a shorter light exposure time and a higher frame rate than a light exposure time and a frame rate of the plurality of RGB image frames.

3. The method of claim 1, wherein the generating of the plurality of pseudo CFA frames comprises generating the plurality of pseudo CFA frames using a first RGB image frame selected from the plurality of RGB image frames and a second RGB image frame which is temporally neighboring the first RGB image frame.

4. The method of claim 1, wherein the first exposure region includes a higher degree of movements of the object and a shorter exposure time than a second exposure region in the sequence of images.

5. The method of claim 1, wherein the image sensor comprises an active pixel sensor (APS) configured to obtain the plurality of RGB image frames and a dynamic vision sensor (DVS) configured to obtain the color event data.

6. The method of claim 5, further comprising:
    detecting, based on the color event data, a degree of movements of an object included in the sequence of images; and
    controlling, based on the degree of movements, a frame rate used for obtaining the color event data.

7. The method of claim 5, further comprising:
    detecting, based on the color event data, a degree of movements of an object included in the sequence of images; and
    controlling, based on the degree of movements, a light exposure time used for obtaining the color event data.

8. The method of claim 1, further comprising:
detecting, based on the color event data, a degree of movements of an object included in the sequence of images.

9. The method of claim 8, further comprising:
generating, based on the color event data, a gray colored two dimensional event map.

10. The method of claim 9, wherein the generating of the plurality of pseudo CFA frames comprises generating the plurality of pseudo CFA frames based on the detecting of the degree of movements of the object and the gray colored two dimensional event map.

11. The method of claim 8, wherein the detecting of the degree of movements of the object comprises detecting movements of edges of the object by detecting a level change of pixels corresponding to the edges of the object.

12. The method of claim 1, wherein the plurality of RGB image frames comprise color information of the sequence of images and the color event data comprises movement information of the sequence of images.

13. An image capturing apparatus, the apparatus comprising:
an image sensor configured to obtain a sequence of images comprising a plurality of red, green, and blue (RGB) image frames and color event data;
a processor configured to:
generate a plurality of pseudo color filter array (CFA) frames based on the color event data,
and a display configured to display the generated dynamic images;
determine, based on a degree of movements of an object included in the sequence of images, a first exposure region and a second exposure region in each of the plurality of pseudo CFA frames,
generate, with the plurality of pseudo CFA frames, a plurality of color adjusted pseudo CFA frames by adjusting colors in the first exposure region,
and generate dynamic images by de-mosaicking the plurality of color adjusted pseudo CFA frames.

14. The apparatus of claim 13, wherein the color event data is captured with shorter light exposure time and higher frame rate than light exposure time and frame rate of the plurality of RGB image frames.

15. The apparatus of claim 13, wherein the generating of the plurality of pseudo CFA frames comprises generating the plurality of pseudo CFA frames using a first RGB image frame selected from the plurality of RGB image frames and a second RGB image frame neighboring the first RGB image frame.

16. The apparatus of claim 13, wherein the first exposure region includes a higher degree of movements of the object and a shorter exposure time than a second exposure region in the sequence of images.

17. A non-transitory computer readable storage medium having a computer readable program stored therein, the computer readable program, when executed on an electronic device, causing the electronic device to:
obtain, by an image sensor, a sequence of images comprising a plurality of red, green, and blue (RGB) image frames and color event data;
generate a plurality of pseudo color filter array (CFA) frames based on the color event data;
determining, based on a degree of movements of an object included in the sequence of images, a first exposure region and a second exposure region in each of the plurality of pseudo CFA frames;
generating, with the plurality of pseudo CFA frames, a plurality of color adjusted pseudo CFA frames by adjusting colors in the first exposure region;
and generate dynamic images by de-mosaicking the plurality of color adjusted pseudo CFA frames.

* * * * *